United States Patent [19]

Katz et al.

[11] Patent Number: 5,080,456
[45] Date of Patent: Jan. 14, 1992

[54] LASER SCANNERS WITH EXTENDED WORKING RANGE

[75] Inventors: Joseph Katz, Stony Brook, N.Y.; Emanuel Marom, Tel Aviv, Israel; Glenn Spitz, Far Rockaway, N.Y.; Naim Konforti, Holon, Israel

[73] Assignee: Symbol Technologies, Inc., Bohemia, N.Y.

[21] Appl. No.: 486,005

[22] Filed: Feb. 26, 1990

[51] Int. Cl.[5] .............................................. G02B 26/10
[52] U.S. Cl. ..................................... 359/214; 235/462; 235/472; 359/221; 359/721; 359/216
[58] Field of Search ................. 350/6.1, 6.3, 6.9, 6.91, 350/6.8, 286, 437, 6.6; 250/236; 235/462, 463, 470, 472; 358/470

[56] References Cited

U.S. PATENT DOCUMENTS

| 4,251,798 | 2/1981 | Swartz et al. | 340/146.3 SY |
|---|---|---|---|
| 4,257,669 | 3/1981 | Scorteanu et al. | 350/6.8 |
| 4,387,297 | 6/1983 | Swartz et al. | 235/462 |
| 4,409,470 | 10/1983 | Shepard et al. | 235/472 |
| 4,630,274 | 12/1986 | Schäfer | 350/437 |
| 4,758,717 | 7/1988 | Shepard et al. | 235/472 |
| 4,760,248 | 7/1988 | Swartz et al. | 235/472 |

OTHER PUBLICATIONS

McLeod, "The Axicon: A New Type of Optical Element", Journal of the Optical Society of America, Aug. 1954, pp. 592-597.
Edmonds, "Imaging Properties of a Conic Axicon", Applied Optics, Aug. 1974, pp. 1762-1764.
Schäfer, "On Some Properties Axicons", Applied Physics B, 1986, pp. 1-8.
Lit et al., "Focal Depth of a Transmitting Axicon", Journal of the Optical Society of America, Apr. 1973, pp. 445-449.
Rioux et al., "Linear, Annular, and Radial Focusing with Axicons and Applications to Laser Machining", Applied Optics, 15 May 1978, pp. 1532-1536.
Häusler et al., "Light Sectioning with Large Depth and High Resolution", Applied Optics, 15 Dec. 1988, pp. 5165-5169.
Rioux et al., "Design of a Large Depth of View Three-Dimensional Camera for Robot Vision", Optical Engineering, Dec. 1987, pp. 1245-1250.
Durnin, "Exact Solutions for Nondiffracting Beams, I, Scalar Theory", J. Opt. Soc. Am. A., Apr. 1987, pp. 651-654.
Indebetouw et al., "Imaging with Fresnel Zone Pupil Masks: Extended Depth of Field", Applied Optics, 1 Dec. 1984, pp. 4299-4302.
McCrickerd, "Coherent Processing and Depth of Focus of Annular Aperture Imagery", Applied Optics, Oct. 1971, pp. 2226-2230.
Pieper et al., "Resolution-Dependent Depth of Focus for an Incoherent Imaging System", Applied Optics, 15 May 1988, pp. 2040-2047.
Durnin et al., "Diffraction-Free Beams", Physical Review Letters, 13 Apr. 1987, pp. 1499-1501.

Primary Examiner—Loha Ben
Attorney, Agent, or Firm—Arnold, White & Durkee

[57] ABSTRACT

A bar code scanner is disclosed employing a laser source and scan mirror for generating a light beam for scanning a bar code symbol or the like. The working range for distance between the scanner and the symbol is extended by placing an optical element in the path between the laser source and the scan mirror. This optical element may be a figure of rotation such as an axicon. A slit may be positioned downstream of the axicon to block the characteristic concentric rings produced in the beam in areas perpendicular to the scan line.

26 Claims, 5 Drawing Sheets

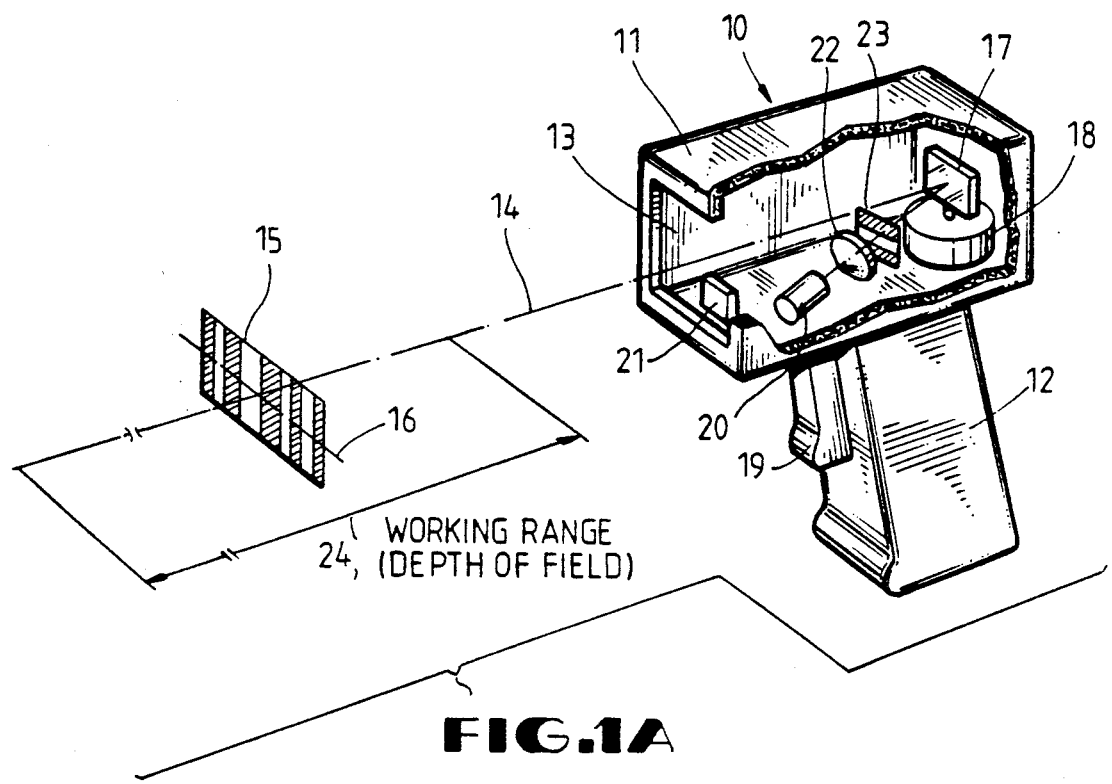
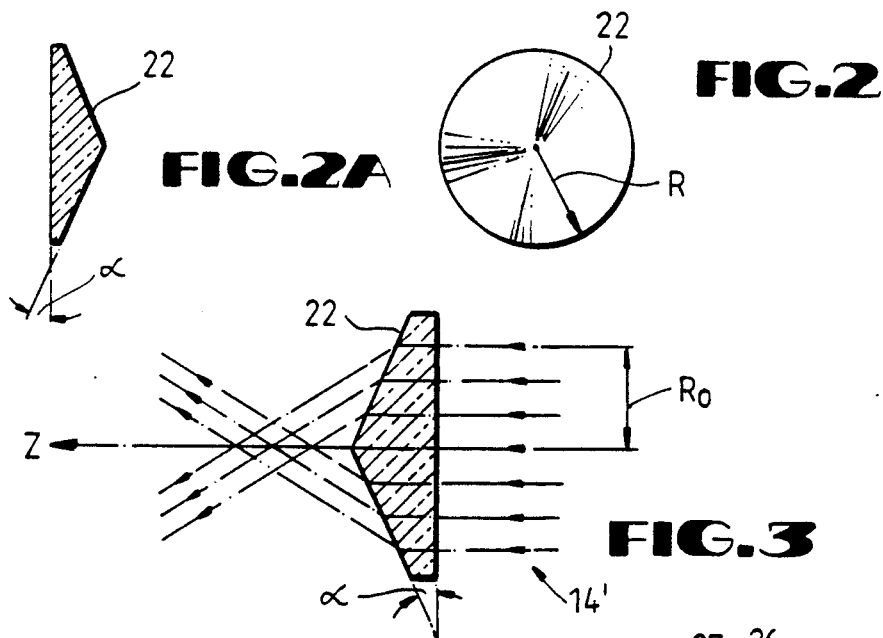
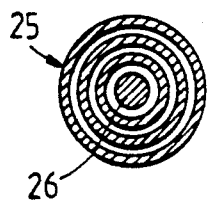
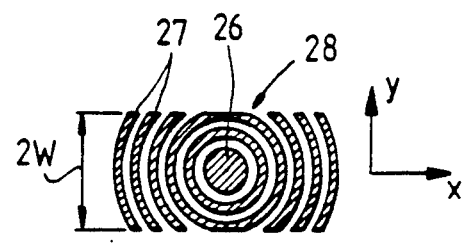

z = 1000 mm z = 2000 mm z = 3000 mm z = 4000 mm z = 5000 mm z = 8000 mm

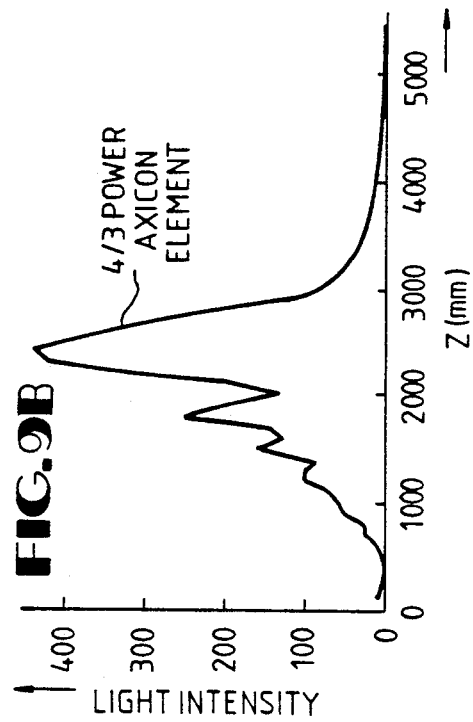
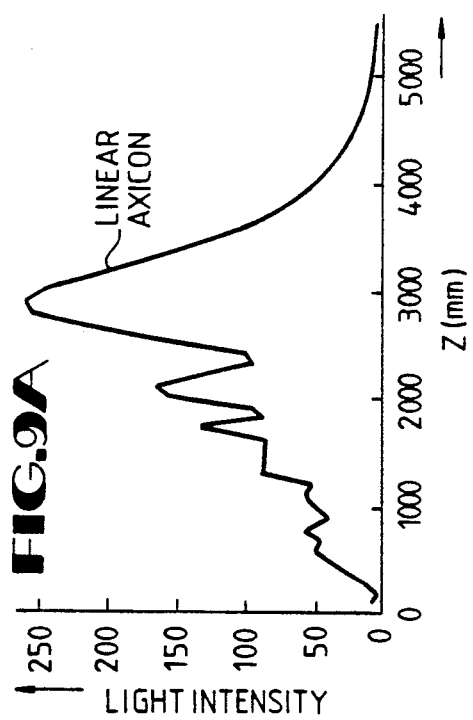
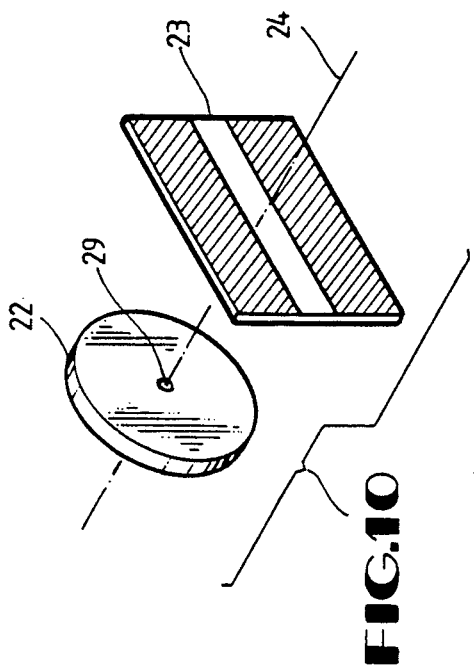
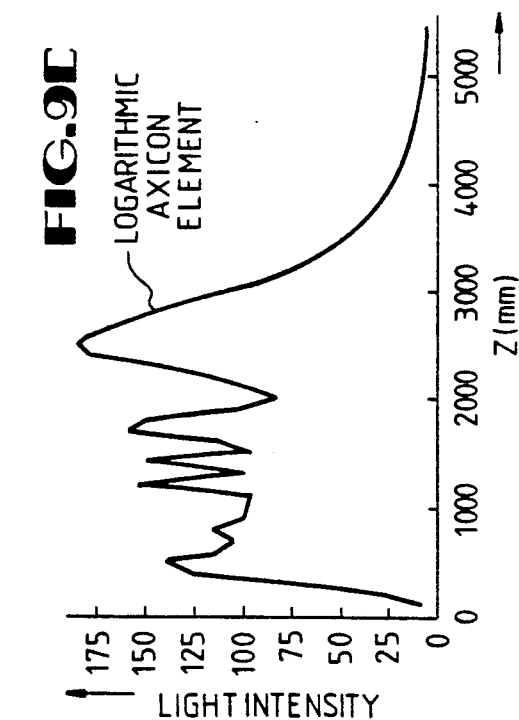

LASER SCANNERS WITH EXTENDED WORKING RANGE

BACKGROUND OF THE INVENTION

This invention relates to bar code scanners, and more particularly to a laser imaging system for generating a laser beam scan pattern with an extended depth of focus or working range.

Various optical readers and optical scanning systems have been developed heretofore for reading bar code symbols appearing on a label or on the surface of an article. The bar code symbol itself is a coded pattern of indicia comprising a series of adjacent bars and spaces of various widths. The bars and spaces having different lightreflecting characteristics.

A number of different bar code standards or symbologies exist. These symbologies include, for example, UPC/EAN, Code 128, Codabar, and Interleaved 2 of 5. The readers and scanning systems electro-optically decode each symbol to produce multiple alphanumerical characters that are intended to be descriptive of the article or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361; 4,387,297; 4,409,470 and 4,460,120, all of which have been assigned to Symbol Technologies, Inc., the assignee of this application.

As disclosed in some of the above patents, one commonly-used example of such a scanning system functions by scanning the laser beam in a line across a symbol. The symbol, composed of alternating, rectangular, reflective and non-reflective segments of various widths, reflects a portion of this laser light. A photo detector then detects this reflected light and creates an electrical signal indicative of the intensity of the received light. The electronic circuitry or software of the scanning system decodes the electrical signal creating a digital representation of the data represented by the symbol scanned.

Typically, a scanner includes a light source such as a gas laser or semiconductor laser that generates a light beam. The use of semiconductor lasers as the light source in scanner systems is especially desirable because of their small size, low cost and low power requirements. The light beam is optically modified, typically by a lens, to form a beam spot of a certain size at a prescribed distance. It is preferred that the beam spot size be no larger than approximately the minimum width between regions of different light reflectivities, i.e., the bars and spaces of the symbol.

A scanner also includes a scanning component and a photo detector. The scanning component may either sweep the beam spot across the symbol and trace a scan line across and past the symbol, or scan the field of view of the scanner, or do both. The photodetector has a field of view which extends across and slightly past the symbol and functions to detect light reflected from the symbol. The analog electrical signal from the photodetector is first typically converted into a pulse width modulated digital signal, with the widths corresponding to the physical widths of the bars and spaces. This signal is then decoded according to the specific symbology into a binary representation of the data encoded in the symbol, and to the alphanumeric characters so represented.

With respect to the scanning system pattern generated by laser scanners, it has been previously known to generate the illuminating laser beam by collimating or focusing the beam using a lens system to create a beam spot of a given diameter at a prescribed working range. The intensity of the laser beam at this point, in a plane normal to the beam (i.e. parallel to the symbol), is ordinarily characterized by a "Gaussian" distribution with a high central peak. Therefore, at a given working range an intensely bright beam spot is generated upon and scanned across the bar code symbol. But, as the distance between the scanner and the symbol moves out of this working range, which is typically only a few inches in length, the intensity of the beam spot greatly decreases due to diffraction of the laser beam. Present scanning systems, accordingly, must be positioned within a relatively narrow range of distances from a symbol in order to properly read the symbol.

SUMMARY OF THE INVENTION

In accordance with one embodiment of the invention, a bar code reader uses a laser beam scanning system which has a greatly extended working range or depth of focus. In a general aspect, the scanning system comprises a laser source, e.g. a gas laser tube or a semiconductor laser diode, an optical means for generating a diffraction pattern with an extended central beam spot of a prescribed diameter, and a scanning means for scanning the modified laser beam across a symbol.

The scanning system of the invention is especially characterized by its ability to generate a scan pattern with an extended working range. In accordance with one embodiment, a regular "gaussian type" optical beam is modified by an optical means comprising a FIGURE of rotation such as an axicon, and, in some embodiments, a slit in the path of the light beam. This optical means produces a beam which diffracts much less in the direction parallel to the bar code pattern; the slit in the light path is parallel to the scan line and perpendicular to the bars and spaces of the bar code symbol to be scanned. Axicons are defined as any figure of revolution that by reflection, refraction, or both will bend light from a point source on the axis of the figure of revolution so as to cross the axis not at a point, as would be the case with a lens, but along a continuous line of points along a substantial extent of the axis. The intensity and diameter of the beam spot created vary insignificantly along the distance of this line. An axicon also produces diffraction rings of light concentric with the central spot, and so the slit may be advantageous to remove these except for areas parallel to the direction of scan, i.e., perpendicular to bars and spaces of the symbol, where they are relatively less disposed to reduce the sharpness of the transitions in the reflected signal.

The scanning system also includes a scanning means for sweeping the extended beam spot across a bar code symbol. Thus, the scanning system scans a bar code symbol in a manner generally similar to existing bar code reading systems; however, the position of the scanner relative to a symbol may be varied greatly relative to existing systems while maintaining reading effectiveness. Expressed otherwise, the scanning system of the invention has a greater working range, or depth of field or focus, than conventional systems. The advantages of the new system have application in both fixed position scanning systems, typically scanners seen at check out stations in stores, and portable or hand-held scanning systems, which are commonly used for inventory work and the like as well as for retail check out.

BRIEF DESCRIPTION OF THE DRAWINGS

The invention itself, both as to its construction and its method of operation, together with additional objects and advantages thereof, will be better understood from the following description of specific embodiments of the invention when read in connection with the accompanying drawings.

FIG. 1a is a pictorial view of a hand-held laser scanner including a scan pattern generator employing an optical element in accordance with this invention;

FIGS. 2b and 2a depict a cross section view and an elevation view, respectively, of an axicon;

FIG. 3 illustrates the manner in which light rays are focused along a continuous line of points along the axis of revolution after passing through an axicon of FIGS. 1 and 2;

FIGS. 4a and 4b illustrate the shape and intensity of a light pattern generated by the axicon;

FIG. 5 depicts the function of a slit to limit the spatial extent of the laser beam in the y-dimension;

FIGS. 9a-9c are a series of plots of light intensities of the beams produced according to the invention as a function of positions along the axis of the beams, for various types of optical elements; and FIG. 10 is an elevation view of a slit element used with an axicon having a central blocking spot, according to an embodiment of the invention.

DETAILED DESCRIPTION OF A SPECIFIC EMBODIMENT

Figure 1B:
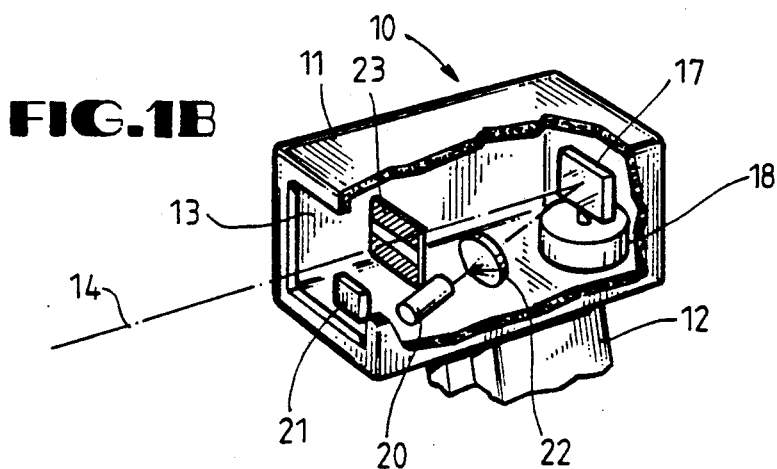
FIG. 1b is a view of a portion of the scanner of FIG. 1a with the slit element positioned in an alternative location, according to another embodiment of the invention.

Referring to FIG. 1a, a hand-held laser scanner device 10 for reading bar code symbols utilizing features of the invention is illustrated. As used in this specification and in the following claims, the term "symbol" is intended to be broadly construed and to cover not only symbol patterns composed of alternating bars and spaces of various widths as commonly referred to as bar code symbols, but also other one or two dimensional graphic patterns, as well as alphanumeric characters. In general, the term "symbol" may apply to any type of pattern which may be recognized or identified by scanning the pattern with a light beam, especially a laser beam.

The laser scanner device 10 includes a housing that is generally of the type shown in the above-mentioned patents having a barrel portion 11 and a handle 12. Although a hand-held pistol-shaped housing is shown, features of the invention may also be implemented in a desk-top workstation or stationary scanner. In the illustrated embodiment, the barrel portion 11 of the housing includes an exit port or window 13 through which an outgoing laser light beam 14 is directed to impinge on and scan across a symbol 15 located exteriorly of the housing. The laser beam moves across the symbol to create a scan line 16. This scanning movement of the laser beam 14 is generated by an oscillating mirror 17 driven by a stepping motor 18. A manually actuated trigger 19 or similar means are provided so the operator can initiate the scanning operation when the device 10 is pointed at the symbol 15; by employing the trigger switch, the power drain is reduced since the components such as the laser light source, the scan motor 18, and the photodetector and decoder can be activated only when the scan is initiated rather than be activated at all times. A laser source 20, e.g. a gas laser tube or a semiconductor laser diode, is mounted in the housing and, when energized, generates the laser beam 14. A photodetector 21 is positioned to be responsive to reflected light from the bar code symbol 15; this detector may be mounted facing the window 13, or may use a convex portion of the scan mirror 17 to focus reflected light, in which case the detector faces the scan mirror. As the beam 14 sweeps the symbol 15, the photodetector 21 detects the reflected light from the symbol 15 creating an analog electrical signal that is typically converted into a pulsewidth modulated digital signal, with the widths corresponding to the physical widths of the bars and spaces of the symbol 15. Such a signal is then decoded according to the specific symbology into a binary representation of the data encoded in the symbol, and the alphanumeric characters so represented.

According to the invention, an axicon 22 and slit 23 are interposed in the light path between the laser source 20 and the exit window 13. This combination of axicon 22 and slit 23 modifies the scanning beam and produces an extended working range 24 of the scanner 10. In one embodiment, the laser source 20 directs the laser beam through an optical means comprising the axicon 22 and the slit 23 to modify and direct the laser beam onto the rotary mirror 17. The mirror 17, mounted on a vertical shaft and rotated by the motor drive 18 about a vertical axis, reflects the beam and directs it through the exit port 13 to the symbol 15.

Although shown in FIG. 1a in a configuration wherein the slit 23 is positioned between the axicon 22 and the mirror 17, it is understood that the slit 23 may be positioned downstream of the mirror as seen in FIG. 1b. The optimum distance between the axicon 22 and the slit 23 is determined by the shape and characteristics of the axicon, since as discussed below the slit is preferably located in a position in the light path after the characteristic light pattern generated by an axicon element has been formed.

In FIGS. 2b and 2a a cross section view and an elevation view, respectively, of the axicon 22 are illustrated, where in this example a cone-shaped optical element has a radius R and describes an angle $\alpha$. As illustrated in FIG. 3, when a collimated laser beam 14' passes through the axicon 22, the axicon bends the light rays in such a manner that they cross the axis of revolution Z not at a point, as in previous scanners using lenses, but along a continuous line of points on the axis of revolution.

For an axicon 22 made of an optical material with an index of refraction n, radius R, and an angle $\alpha (\alpha << 1$-radian), the depth of field $Z_d$ (i.e., the length of range 24 of FIG. 1), is given by $$Z_d = R/(n-1)\alpha.$$

Within the region defined as this range 24 along the axis of revolution Z the axicon 22 generates an interference pattern 25 as seen in FIG. 4a comprising a central disk or beam spot 26 of high intensity and surrounding rings 27 of lesser intensity. FIG. 4 includes a generalized plot of beam intensity vs. lateral displacement. The shape of this optical pattern does not vary substantially along the optical axis Z within the depth of field 24, and the diameter d of the central spot 26 may be calculated using diffraction theory:

$$d = 2.4\lambda/\pi(n-1)\alpha \quad (\alpha \ll 1\text{-radian})$$

where $\lambda$ denotes the wavelength of the laser beam. For example, for $\lambda = 670$ nm, $\alpha = 0.1°$, $n = 1.5$, and $R = 5$ mm, we obtain $Z_d = 5.7$ m and $d = 0.6$ mm. In contrast, the working range of a Gaussian beam having a $d_{eff} = 0.6$ mm is less than about 1-m.

Since the total energy in the outer rings 27 is of the order of the energy contained in the beam spot 26, these rings may substantially reduce the contrast desired when scanning bar codes. To minimize any such reduction in contrast caused by these outer rings 27, the slit 23 is preferably employed to limit the spatial extent of the beams in the y-dimension to produce a shape 28 as shown in FIG. 5. The width of the slit 23, and thus the height of the scanned shape 28 (y-direction) is selected to provide the optimum resolution without unduly sacrificing efficiency; for example, this height may be about twice the width w of the central spot 26. Since bar codes are generally one-dimensional symbols, resolution can be sacrificed in the y-direction, parallel to the bars, without significantly compromising the performance of the scanner. While reduction of the width of the slit 23 improves contrast and the performance of the scanner, the extent to which the width may be reduced is limited by the increased power requirements placed upon the laser source 20. For example, if a laser beam is passed through an axicon 22 with a 5 mm radius and a 0.3 mm wide slit 23, 75% of the light is lost, according to $$\sqrt{(w/R)} = \sqrt{(0.3/5)} = 0.25$$

Generally, this limitation is insignificant since laser sources emitting 5 mW of power are currently available and most scanners only require 1 mW of transmitted power. The slit 23 may be formed by a free-standing element of a solid opaque material having a transparent opening of the desired width. Alternatively, the axicon 22 itself may be shaped to define the shape of the slit 23, i.e., truncated along its upper and lower edges.

Figure 6:
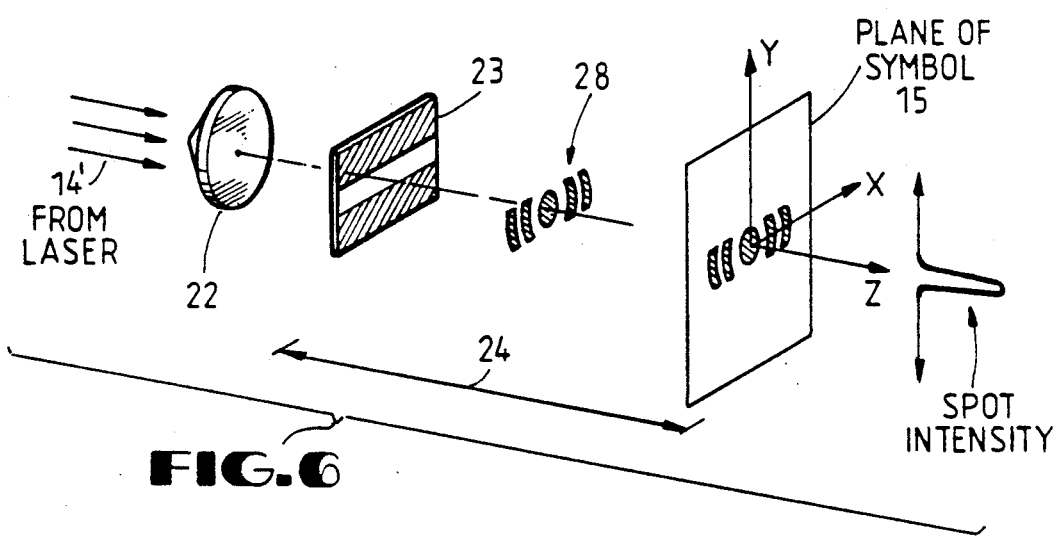
FIG. 6 is a pictorial view in schematic form of the light distribution for a beam produced by a slitted axicon.

The arrangement of the axicon 22, slit 23 and the shaping of the beam 14 in the area of the working range 24 is illustrated in pictorial form in FIG. 6. The beam 14 is usually scanned in an X direction across the bar code symbol (in the plane of the symbol) by the oscillating mirror 17 of FIG. 1a.

Figure 7:
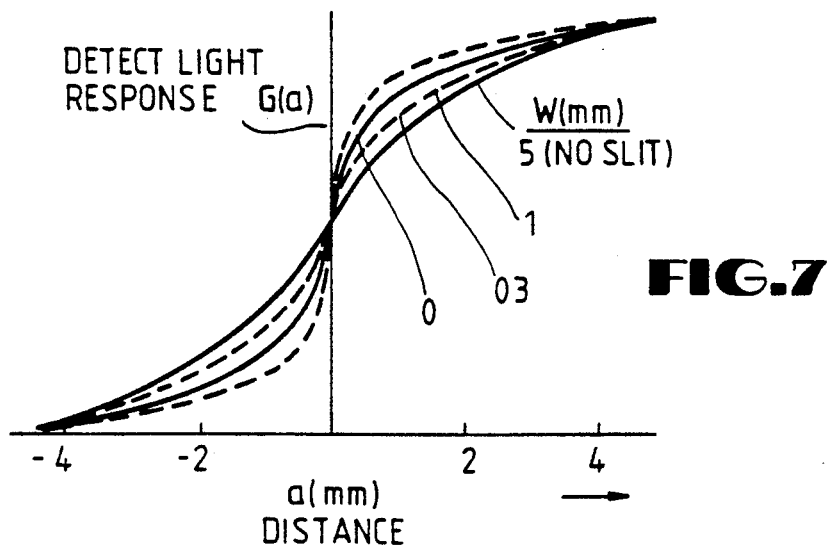
FIG. 7 is a plot of detected light response vs. light beam position for a light beam scanned across an edge of a bar code element, for various values of the width of the slit.

Referring to FIG. 7, the effect of varying the width of the slit 23 is illustrated; the step responses using a non-defracting beam as produced by the device of FIGS. 1-6 with slits of varying width is shown; the distance a (in mm) is the position of the beam with respect to the edge of a "step-function" bar code element, and G(a) is related to the response of the detector 21. The width w of the slit 23 varies from 0-to-5 mm, and it is seen that the greatest resolution is obtained with a smaller slit, but, of course, the light level will suffer and severe diffraction effects will be detrimental so a compromise is selected.

Thus, as the beam 14 scans across the symbol 15, the central spot 26 effectively forms a linear track or trace of light across the symbol 15. The central spot 26 is, in effect, a thin column of light extending along the distance 24 comprising a continuum of focused central spots rather than a single central spot. As long as the symbol 15 remains within this continuum defined by length 24, the beam spot created on the symbol will maintain its sharp intensity and will allow the system to function properly.

The features of the invention are described above in the context of employing a collimated beam; i.e., the beam emerging from the source 20 or entering the axicon 22 of FIG. 3 is collimated, so the wave front is a plane or the "beams" of light in the light beam 14' of FIG. 3 are parallel. Alternatively, however, the beam 14' can be converging or diverging at this point, and the effect of these alternatives is to displace the working range 24. A divergent beam tends to move the working range outward, and a convergent beam tends to move the working range 24 inward.

Figure 8A:
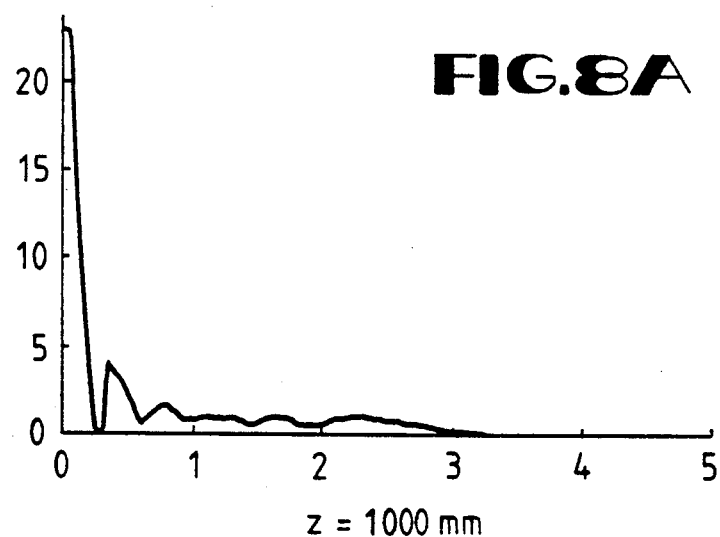
FIGS. 8a-8f are a series of plots of light intensities vs. distances in the X direction for various values of distances in the Z direction, using an axicon as in FIG. 1.
Figure 8B:
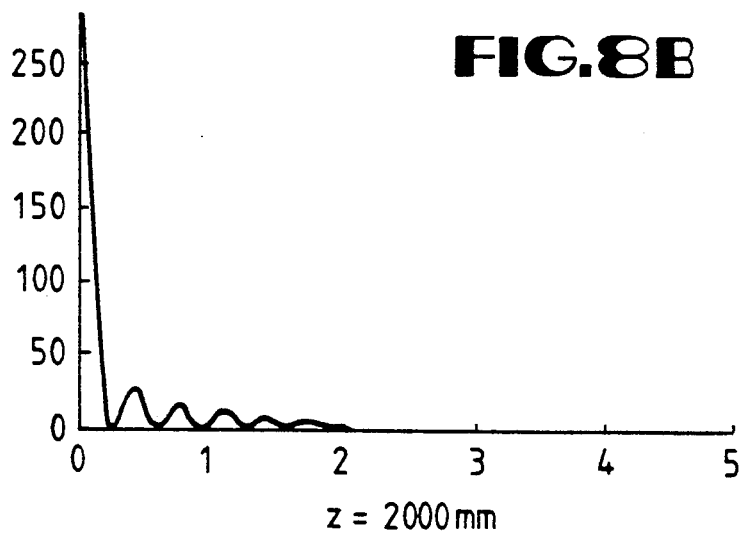
Figure 8C:
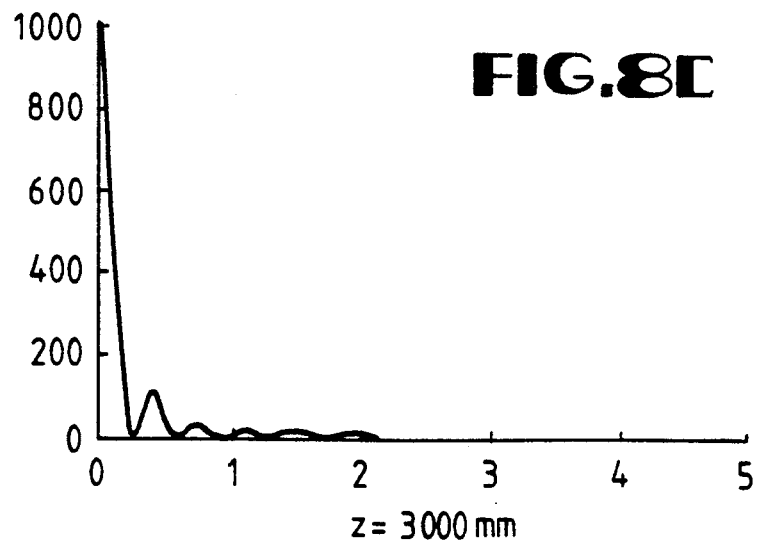
Figure 8D:
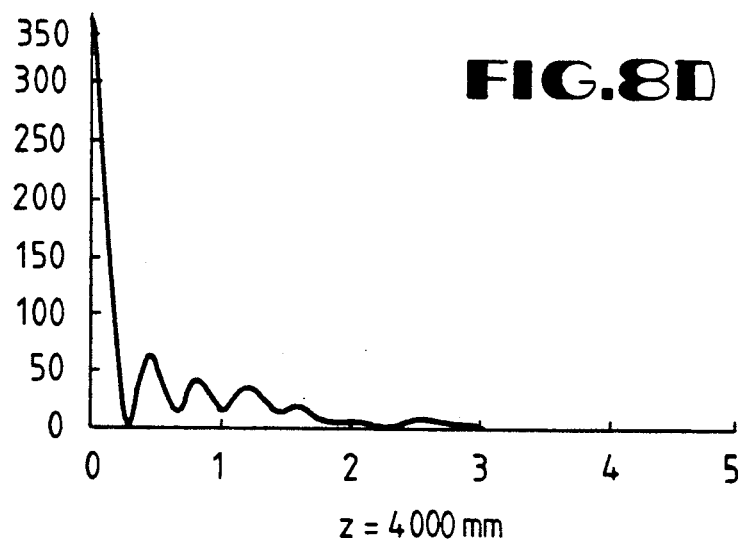
Figure 8E:
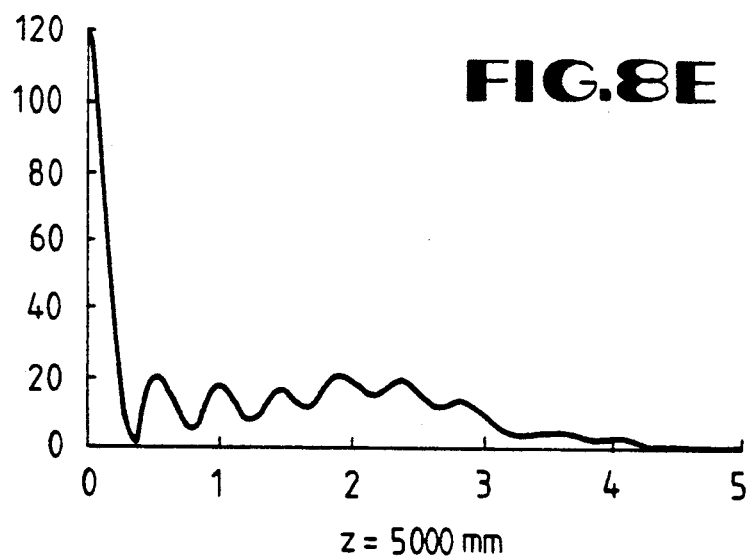
Figure 8F:
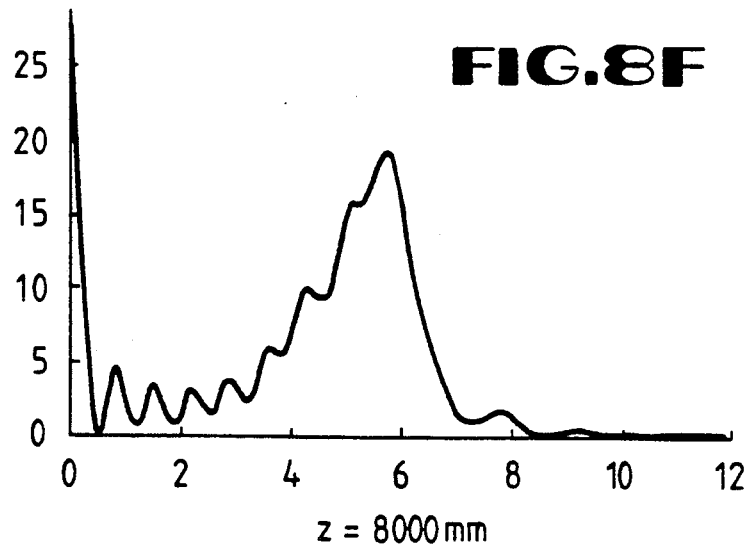

An optical system consisting of a collimated beam 14' illuminating an aspheric element such as an axicon 22 produces a light intensity distribution that is dependent upon various factors, including the shape of the aspheric element (angle $\alpha$ for an axicon), the wavelength of the light, the width of the aperture 23 if any, etc. Calculations based upon the Fresnel integral in the Rayleigh approximation, for a conical axicon, provide a quantitative definition of the light distribution as plotted in FIGS. 8a-8f, for example, where the light intensity as a function of X, distance from the center of the spot 26, are plotted for various values of Z. It is noted that a very favorable distribution is obtained from $Z = 1000$ mm up to $Z = 4000$ mm, with the size of the central spot being of radius R less than about 0.25 mm, then a "donut" shaped light distribution is exhibited at $Z = 8000$ mm in FIG. 8f where a pronounced peak develops at about $x = 6$ mm. This donut-shaped distribution would be unsuitable because a high-intensity ring of light would surround the central spot 26, peaking at about $x = 6$ mm. Similar calculations can show the effects of various sizes of axicons, and angles $\alpha$. Also, it can be demonstrated by such calculations that there is some benefit in reducing the amplitude of secondary peaks 27 by placing a central stop blocking the center of the illumination beam; for example, when using a slit 23 of 4 mm, an opaque spot of 2 mm diameter may be placed in the center of the beam at a location on the axicon itself.

Calculation of light intensity for an axicon type of element that is shaped differently from a linear axicon demonstrates that a length 24 in which the beam intensity is of adequate level is somewhat more optimum. A linear axicon is a cone created by rotation of a straight line, whereas a 4/3 power element is formed by rotation of a 4/3-power curved line. Referring to FIGS. 9a to 9c, the light intensity along the axis of a beam produced by an axicon-like element 22 for linear, 4/3 power and logarithmic elements is illustrated. Note that the shape of the axial distribution of light intensity changes for the different elements. The 4/3 power element produces improved results because the on-axis intensity increases quadratically. A logarithmic element may similarly be advantageous in that the on-axis intensity is more uniform over the working range. As with linear axicons, these 4/3-power or logarithmic elements can also be improved for bar code scan purposes by adding a slit 23 and a central blocking spot 29, as is illustrated in FIG. 10; this slit element is positioned in the path of the beam 14 as illustrated in FIGS. 1a, 1b, and 6.

In operating the scanner described above, the operator depresses the trigger 19 which activates the laser tube 20 or laser diode. The laser tube 20 generates a laser beam which passes through the axicon 22 and slit 23 combination. The axicon 22 and slit 23 combination modify the beam, creating an intense beam spot 26 of a given diameter which extends continuously and does not vary substantially over a distance 24. The axicon and slit combination directs the beam onto the rotary mirror 17, which directs the modified laser beam outwardly from the scanner housing 11 and toward the bar code symbol 15 in a sweeping pattern, i.e., along scan line 16. A bar code symbol 15, placed at any point within the distance 24 and substantially normal to the laser beam 14, reflects a portion of the laser light. The photodetector 21, mounted in the scanner housing 11, detects the reflected light and converts the received light energy into an analog electrical signal. The system circuitry then converts the analog signal to a pulse width modulated digital signal which the decoder, typically consisting of a microprocessor device together with appropriate program instructions stored in a ROM, decodes according to the characteristics of the bar code type.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A bar code scanner comprising:
   a) a light source for directing a collimated beam of light in a path toward a symbol to be scanned, and a moving optical element in said path to cause the beam of light to move along a scan line;
   b) optical means in said path for creating a spot of light defined by said beam having a size related to the size of features of said symbol to be scanned, said beam of light exhibiting said spot size over a substantial distance along an axis of said beam, the optical means including a slit in said path perpendicular to the axis of said beam;
   c) and a light detector positioned to receive light reflected from said symbol.

2. A scanner according to claim 1 wherein said light source is a laser.

3. A scanner according to claim 1 wherein said optical means is a solid optical element in the shape of a figure formed by rotation of a line about an axis, said line being at an angle to said axis.

4. A scanner according to claim 3 wherein said figure is a linear axicon.

5. A scanner according to claim 3 wherein said beam of light is refracted by said optical means.

6. A scanner according to claim 3 wherein said beam of light is deflected by said optical means.

7. A scanner according to claim 3 wherein a central opaque portion is provided at the center of the figure.

8. A scanner according to claim 1 wherein said optical means is in the shape of a figure defined by rotation of a 4/3 power curve about an axis.

9. A scanner according to claim 1 wherein said slit extends parallel to a direction of scan of said beam.

10. A scanner according to claim 1 wherein said symbol is a bar code symbol having bars and spaces extending perpendicular to said scan line, and the size of said light spot as it traverses said scan line on said symbol is not substantially greater than a minimum width of said bars and spaces.

11. A scanner according to claim 1 wherein said optical means is in the shape of a figure defined by rotation of a logarithmic curve about an axis.

12. A method for scanning a symbol, comprising the steps of:
   a) generating a collimated light beam and directing said light beam toward a symbol to be read;
   b) moving said light beam by a moving optical element to generate a scan line across said symbol to be read;
   c) modifying said light beam in the path toward said symbol to create a spot of light of a size correlated generally with the size of features of said symbol, said spot maintaining a substantially constant size for varying distances to said symbol, over a substantial range of said distances on an optical axis, the step of modifying including passing the light beam through a slit in said path perpendicular to said optical axis.

13. A method according to claim 12 wherein said light beam is a laser light beam.

14. A method according to claim 12 wherein said light beam is scanned across said symbol.

15. A method according to claim 12 wherein said step of modifying includes directing said light beam through a solid optical element in the shape of a figure formed by rotation of a line about an axis, said line being at an angle to said axis.

16. A method according to claim 15 wherein said figure is a linear axicon.

17. A method according to claim 12 wherein said step of modifying includes deflecting said light beam by a solid optical element in the shape of a figure formed by rotation of a line about an axis, said line being at an angle to said axis.

18. A method according to claim 12 wherein said step of modifying includes directing said light beam through a solid optical element in the shape of a figure defined by rotation of a 4/3-power curve about an axis.

19. A method according to claim 12 wherein said symbol has features extending perpendicular to said scan line, and said step of modifying includes passing said light beam through a slit extending perpendicular to said features of said symbol.

20. A method according to claim 12 wherein said step of modifying includes directing said light beam through a solid optical element in the shape of a FIGURE defined by rotation of a logarithmic curve about an axis.

21. Apparatus for detecting indicia having portions of different light reflectivity such as a bar code symbol comprising:
   (a) a light source operable to emit a substantially monochromatic collimated beam of light having a predetermined diffraction pattern;

(b) optical means disposed in the path of the beam of light for modifying the diffraction pattern of the light beam and creating a beam spot of a predetermined diameter, said diameter being relatively constant over a predetermined distance along an optical axis passing through the center of and normal to said optical means;

(c) means for directing the beam spot to said indicia, said indicia lying in a reference plane which is substantially normal to the optical axis, said means being adapted to scan spatially adjacent portions of said indicia; and (d) sensor means for detecting at least a portion of light of variable intensity reflected off the indicia, and for generating an electrical signal indicative of the intensity of said detected light.

22. Apparatus as defined in claim 21, wherein said optical means comprises:

(a) an axicon having a predetermined index of refraction and a predetermined cross section angle, being operable to create the beam spot of constant diameter along the predetermined distance along the optical axis by focusing the beam of light along a continuous series of points along the predetermined distance along the optical axis; and (b) a slit having a predetermined width and being adapted to pass the beam spot created by the axicon and to restrict the passage of light exterior to the beam spot in a direction perpendicular to the slit.

23. Apparatus for reading an optically coded symbol comprising:

(a) a laser light source operable to emit a beam of collimated coherent light directed in a path toward said symbol;

(b) an axicon in said path adapted to receive the light beam and to generate a diffraction pattern comprising a central beam spot having a predetermined diameter and exterior rings surrounding the beam spot, said beam spot and diffraction pattern being of substantially constant size along a predetermined distance along an optical axis, said optical axis being normal to and passing through the center of said axicon;

(c) a slit of a predetermined width in said path adapted to limit the spatial extent of the diffraction pattern generated by the axicon;

(d) means for directing the beam spot onto and across the symbol to be read; and (e) sensor means operative for detecting at least a portion of light reflected off the symbol, and for generating an electrical signal indicative of the intensity of the detected light.

24. Apparatus as defined in claim 23, further comprising means for converting said electrical signal into a digital representation of the data encoded in the symbol.

25. A method for scanning a symbol, comprising the steps of:

(a) generating a substantially monochromatic beam of collimated light having a predetermined diffraction pattern;

(b) modifying the diffraction pattern of the beam of light to create a beam spot of a substantially constant diameter which extends along a predetermined distance along the path of said beam; and (c) directing the extended beam spot onto a symbol to be read.

26. A method as defined in claim 25, wherein said step of modifying the diffraction pattern of the beam of light includes:

(a) adapting an axicon to focus the beam of light along a continuous series of points along a predetermined extent of an optical axis; and (b) adapting a slit to limit the spatial extent of the diffraction pattern generated by the axicon in a direction perpendicular to the symbol to be read.

* * * * *